United States Patent
Kanada et al.

(10) Patent No.: US 6,612,786 B1
(45) Date of Patent: Sep. 2, 2003

(54) CUTTING TOOL OF POLYCRYSTALLINE HARD SINTERED MATERIAL

(75) Inventors: Yasuyuki Kanada, Itami (JP); Kazufumi Yamanaka, Itami (JP)

(73) Assignee: Sumitomo Electric Industries, Ltd., Osaka (JP)

(*) Notice: Subject to any disclaimer, the term of this patent is extended or adjusted under 35 U.S.C. 154(b) by 218 days.

(21) Appl. No.: 09/723,744

(22) Filed: Nov. 27, 2000

(30) Foreign Application Priority Data

Nov. 25, 1999 (JP) ............................................ 11-334344

(51) Int. Cl.⁷ ............................ B23B 27/14; B23P 15/28
(52) U.S. Cl. ........................................ 407/118; 407/119
(58) Field of Search .................................. 407/118, 119; 408/144, 145; 428/408, 698, 704, 472, 469; 51/309

(56) References Cited

U.S. PATENT DOCUMENTS

| 5,178,645 A | * | 1/1993 | Nakamura et al. ........... 407/119 |
| 5,183,362 A | * | 2/1993 | Kuroyama et al. .......... 407/116 |
| 5,193,948 A | * | 3/1993 | Noggle ....................... 407/116 |
| 5,569,000 A | * | 10/1996 | Littecke et al. ............. 407/114 |
| 5,697,994 A | * | 12/1997 | Packer et al. ................ 428/332 |
| 6,140,262 A | * | 10/2000 | Collier et al. ............... 407/119 |
| 6,161,990 A | * | 12/2000 | Oles et al. ................... 407/113 |
| 6,287,682 B1 | * | 9/2001 | Grab et al. .................. 407/119 |

FOREIGN PATENT DOCUMENTS

| EP | 0 413227 | 2/1991 |
| JP | 61 100302 | 5/1986 |
| JP | 6-194857 | 6/1994 |
| JP | 6190610 | 7/1994 |
| JP | 7185909 | 7/1995 |
| JP | 8192305 | 7/1996 |
| WO | WO 98/17839 | 4/1998 |

\* cited by examiner

*Primary Examiner*—Henry W. H. Tsai
(74) *Attorney, Agent, or Firm*—W. F. Fasse; W. G. Fasse

(57) ABSTRACT

A cutting edge of a cutting tool is made of a polycrystalline hard sintered material containing at lest 20 vol % of CBN. A radius of curvature in cross section of a ridge of the cutting edge is between 5 μm and 30 μm. A flank and a rake face or negative land of the cutting tool are smoothly continued from the radius of curvature in cross section. The surface roughness of the ridge of the cutting edge is from 0.1 μm to 1.0 μm as an average roughness (Rz) of a ten point system.

8 Claims, 2 Drawing Sheets

CUTTING TOOL OF POLYCRYSTALLINE HARD SINTERED MATERIAL

BACKGROUND OF THE INVENTION

1. Field of the Invention

The present invention relates to a cutting tool of a polycrystalline hard sintered body containing a cubic crystal boron nitride(hereinafter, referred to as CBN) and having a cutting edge treated at an insert thereof.

2. Description of the Related Art

A material where powder of CBN is sintered with various kinds of bonding agents exhibits an excellent performance for cutting iron family metals or cast iron having high hardness. Particularly, in a machining of hardened steel having high hardness, when the machining is carried out with a tool of CBN, a roughness on a finished surface and a precision in machined size are equivalent to those of a grinding. Accordingly, the grinding using a conventional grinder is changed to a cutting using the tool of CBN in a part of the cutting of hardened steels.

This inclination has more developed, and such a demand has recently been raised that the cutting is substituted for a machining field requiring the high precision only possible conventionally with the grinding. Objects to be cut by a tool containing CBN are materials of hard quality such as hardened steel or cast iron. It has been hardly conceived to obtain a finish surface near to a mirror surface by the cutting. A precision machining referred to herein is meant by a dimensional precision such as the surface roughness and the roundness on the cut surface.

On the other hand, the most advanced precision cutting is a cutting of non-ferrous metal using single crystal diamond. A main application field is in a machining of aluminum based alloys such as a base board of memory disk or polygon mirror. There is nowadays a tendency to replace a single crystal with polycrystal diamond easier to machine at lower cost. In the polycrystal diamond tool, if a large unevenness is formed on a ridge of the cutting edge due to difference in steps at crystal interface, it cannot be removed even by grinding the flank or the rake face of the tool. There occur problems that this unevenness remains in the ground surface, and is transferred to a work piece to hinder the machining at high precision. A case of polycrystal diamond cutting tool described in Japanese Patent Unexamined Publication No. Hei. 6-190610(JP-A-6-190610) has solved this problem by chamfering the tool at an insert thereof. That is, the flank face of the cutting edge using the polycrystal diamond is formed to be a ground face without ground trace, and the ridge of the cutting edge is chamfered with a fine width by the grinding so as to smoothen the cutting edge at the ridge. However, since in the tool of polycrystal diamond, carbon composing diamond reacts with steel, this tool cannot be used to the cutting of a hardened steel or a cast iron.

SUMMARY OF THE INVENTION

In view of the problems involved with the conventional technique, when a hardened steel is subjected to the cutting, the invention is to make the surface roughness on the cut face 1.6 $\mu$m or less at Rz and to improve the dimensional precision of the roundness to be 3 $\mu$m or less. As a field of uses, many cases are of materials to be cut of diameter being around 30 mm or smaller. Namely, the superior roughness of a finished surface and the high precision in machined size are realized by improving a shape of the cutting edge and the surface roughness of the cutting tool of a polycrystalline hard sintered body containing CBN. "Rz" is meant by the average roughness of the ten point system specified by B0601 "Surface roughness—Definition and Designation" of JIS.

According to a first aspect of the invention, the cutting tool of the polycrystalline hard sintered body having a cutting edge treated at an insert according to the invention comprises the polycrvstalline hard sintered material containing 20 vol % or more CBN, radius of curvature in cross section of a ridge of a cutting edge is between 5 $\mu$m or more and 30 $\mu$m or less, a flank and a rake face or negative land of the tool are smoothly continued at said radius of curvature in cross section. And, surface roughness of the ridge of the cutting edge is from 0.1 $\mu$m or more to 1.0 $\mu$m or less according to an average roughness of the ten point system (Rz). By making such a structure, it is possible to machine a work piece at high precision.

According to a second aspect of the invention, the surface roughness on the rake face or the negative land of the tool ranges from 0.1 $\mu$m or more to 0.5 $\mu$m or less according to the average roughness (Rz) of the ten point system. By making such a structure, it is possible to offer a cutting tool of a long life, because the surface roughness on the cutting edge can be kept small, even if the ridge of the cutting edge is worn and moves backward during machining.

According to a third aspect of the invention, a wedge angle at the insert made between the flank and the rake face of the tool or the flank and the negative land of the tool is from 65° or more to 125° or less. By making such angles, it is possible to economically make the cutting edge of the tool.

According to a fourth aspect of the invention, the polycrystal hard sintered material contains 20 vol % or more CBN, and the average grain diameter is from 0.01 $\mu$m or more to 5 $\mu$m or less. By making such a structure, it is possible to economically make the cutting edge of the tool.

According to a fifth aspect of the invention, the polycrystalline hard sintered material is bonded to a base material of the tool made of cemented carbide. Because, for carrying out the high precision machining, the polycrystalline hard sintered material must be bonded to a base material of the tool having high rigidity.

According to a sixth aspect of the invention, a pair of straight cutting edges respectively have length ranging from 0.2 to 0.6 mm, said cutting edges being connected to a nose r from respective terminals of the nose r of the polycrystalline hard sintered material toward a side of an indexable insert, and angle between a straight line bisecting said nose r and the straight cutting edges is formed to be 42°≦θ10, θ11 ≦45°. Thereby, the part of the straight cutting edge can drag the cut face to improve the surface roughness on the finished face.

According to a seventh aspect of the invention, the surface is formed with the coated layer by a chemical vapor deposition or a physical vapor deposition. The wear at the ridge of the cutting edge is reduced thereby, so that the roughness on the finished surface of the work piece may be improved, and the life of the tool may be lengthened.

DETAILED DESCRIPTION OF THE PREFERRED EMBODIMENT

Figure 1:
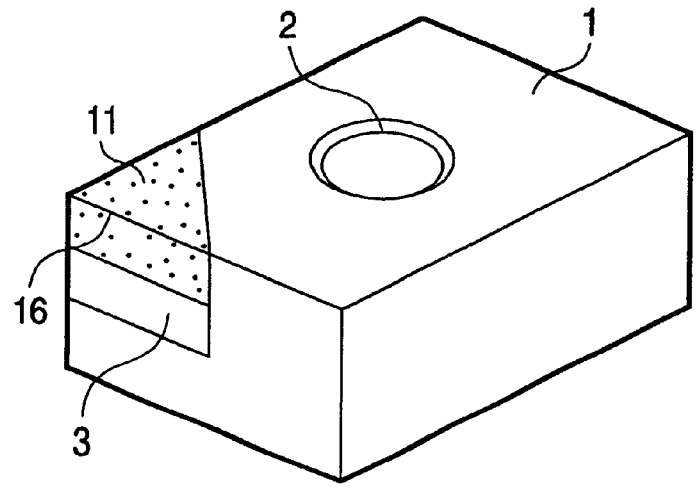
FIG. 1 is a perspective view of the cutting tool concerned with the invention.

An example of the cutting tool of the polycrystalline hard sintered body to be used in the invention is shown in FIG. 1. A polycrystalline hard sintered body 11 has a double layered structure integrally united with a cemented carbide base 3, a tool base material is formed in such a manner that this double layered structure is brazed at a corner of a tool base material 1 made of cemented carbide. Of course, the invention can be applied to a cutting tool not using the cemented carbide base 1. The cutting tool is attached to, e.g., a holder (not shown) through an attaching hole 2. The cutting tool is, according to embodiments, enumerated as an indexable insert shown in FIG. 1 or a bite directly brazed to the holder as later mentioned in an Example 3. The invention is concerned with a structure of the ridge of the cutting edge which is the most important part participating in the cutting performance of the cutting tool.

Figure 2:
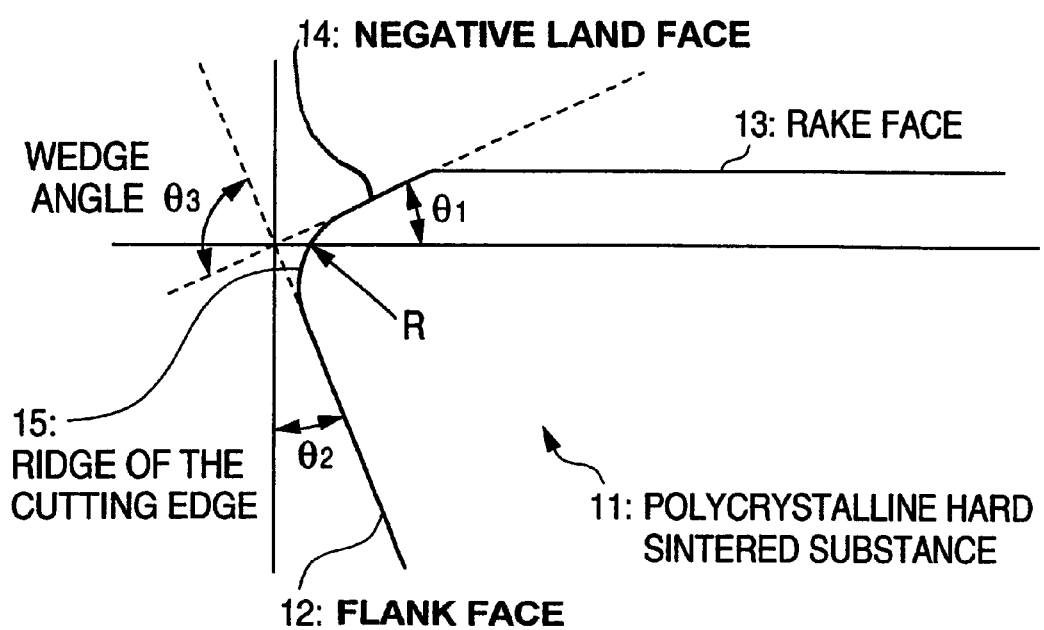
FIG. 2 an enlarged sectional view of the cutting tool concerned with the invention.
Figure 3:
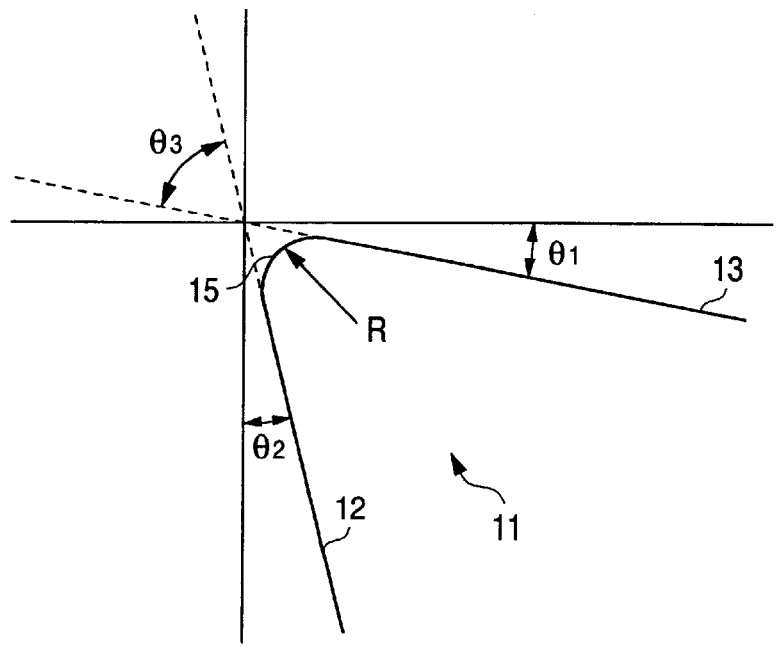
FIG. 3 is an enlarged sectional view of the cutting tool concerned with the invention.

One of the inventors has studied cutting tools of the polycrystalline hard sintered body containing CBN for enabling cutting with high precision. The results of the studies will be explained referring to FIGS. 2 and 3 of the attached drawings. FIGS. 2 and 3 are enlarged views of a cross section perpendicularly to a line 16 composing a cutting edge of FIG. 1. FIG. 2 is an enlarged cross sectional view of the cutting tool having a negative land 14. Reference numeral 11 indicates the polycrystalline hard sintered body, 12 is a flank of the tool, 13 is a rake face of the tool, and 15 is a ridge of the cutting edge. The ridge of the cutting edge 15 is smoothly connected to a negative land 14 or to the rake face 13 and the flank 12 of the tool with a radius R of curvature in cross section. The phrase "smoothly connected" referred to herein means "continuously connected", in other words, "without an angular transition" or "no angular transition". An angle θ1 made between a horizontal line to be a reference when cutting and the negative land or the rake face of the tool is a rake angle, and an angle θ2 between a vertical line and a flank face of the tool is a flank angle of the tool. In the case of FIG. 2, the rake angle θ1 is negative or in the minus direction, and in the case of FIG. 3, the rake angle is in a plus direction and there is no negative land. θ3 is an angle made between the flank and the rake face of the tool, showing a wedge angle at the insert of the tool.

The ridge of the cutting edge 15 is formed at a part crossing portion between the flank 12 and the rake face 13 of the tool, or between the flank 12 and the negative land 14 of the tool. The inventor has found that the radius R of curvature in cross section and a surface roughness of the ridge portion are important. It is important that the ridge of the cutting edge is formed with a curve having the radius R of curvature in cross section ranging from 5 to 30 µm, and the curve is continuously connected to the flank 12, the rake face 13 and the negative land 14 of the tool. It is found that if the surface roughness of the ridge of the cutting edge falls into the range from 0.1 to 1 µm at the average roughness (Rz) of the ten point system, an excellent finished surface roughness can be realized and the high precision machining can be performed.

Conventionally, the cutting tool of the polycrystalline hard sintered body containing CBN was edged by using a diamond grinder of grain size of contained diamond being around #600 and by grinding the rake face and the flank. It was found that the ridge of the cutting edge of the thus made cutting tool of sintered body had remarkable unevenness as partially and largely broken at the ridge of the cutting edge.

When cutting a very hard material such as a hardened steel with the cutting tool of CBN, a shape of the ridge of the cutting edge is liable to transfer to a workpiece. Therefore, when machining the very hard material to achieve an excellent finished surface roughness, a cutting tool was required to have a smooth and small surface roughness, and to have reduced breakage of the CBN at the ridge of the cutting edge. In case a cutting resistance is high, a so-called chatter on the surface of the workpiece is easily caused. For solving the problems of the invention, the inventors accordingly considered it the most important that the surface roughness of the ridge of the cutting edge was made small and smooth, and secondly it was an important theme to reduce the cutting resistance.

To produce the cutting tool having the ridge of the cutting edge of the simply small surface roughness, a cutting edge could be formed taking time and labor by means of the diamond grinder having small grains of around #3000 to #14000. But it was difficult to smoothly continue the rake face and the flank of the tool to the ridge of the cutting edge.

The cutting tool of the polycrystalline hard sintered body of the invention is edged by grinding the flank and the rake face of the tool with a diamond grinder of grain diameter being around #600 to #3000, and subsequently, with a coated rotary brush with diamond free abrasive grains of around #1500 to #3000 so as to polish an edged vicinity. Namely, such a cutting tool can be obtained in which the surface roughness of the cutting tool is small and smooth and the ridge of the cutting edge is smoothly continued to the rake face and the flank of the tool. By smoothly continuing, cut chips can be rapidly removed.

Next, for lowering the cutting resistance, it was studied to reduce the radius R of curvature in cross section. In this course, if the radius R of curvature in cross section was too small, an aimed surface roughness could not be industrially provided, because unevenness could not be smoothened at a small radius of curvature in cross section. Then, samples of various kinds of radius of curvature in cross section were prepared and investigated by the above mentioned polishing method. As a result, if the radius R of curvature in cross section ranged from 5 to 30 µm, the cutting tool of small cutting resistance could be provided. For developing, it was assumed that the radius R of curvature in cross section had to be by far smaller than 5 µm, but unexpectedly it was found that the surface roughness was made better at 5 µm or more.

For realizing the surface roughness of the invention by polishing to remove breakage by free abrasive grains after polishing the edged vicinity as mentioned above, the radius R of curvature in cross section of the ridge of the cutting edge is preferably 5 µm or more. If exceeding 30 µm, since the substantial rake angle of the tool becomes large in the minus direction, the cutting resistance increases and the cutting quality decreases during machining. In particular, in case machining the highly hard material at the high precision, since a thrust force is high and its fluctuation amount is large, it is difficult to get a high precision of machining size. Therefore, it is preferable that the radius R of curvature in cross section of the ridge of the cutting edge ranges from 5 to 30 µm.

On the other hand, in the machining of the highly hard material by the conventional grinding, the finished surface roughness is around 1.6 μm or less at the average roughness (Rz) of the ten point system, and this is aimed by the invention. For accomplishing this aim, preferably the surface roughness of the ridge of the cutting edge of the cutting tool is 1.0 μm or less at the average roughness (Rz) of the ten point system. For finishing the surface roughness of the ridge of the cutting edge to be less than 0.1 μm, much labor is required and not desirable from the viewpoint of economics, and it is preferable that the surface roughness of the ridge of the cutting edge ranges from 0.1 μm or more to 1.0 μm or less.

Since the cutting edge of the tool is worn as continuing the machining, the ridge of the cutting edge moves backward, but a new ridge of the cutting edge is to be formed from the worn flank and the rake face or the negative land of the tool. For maintaining an excellent surface roughness during continuously machining, the surface roughness of the rake face or the negative land should be small. Considering that the requisite surface roughness of the ridge of the cutting edge is below 1.0 μm and the surface roughness increase during cutting, it is preferable that the surface roughness of the rake face and the negative land of the tool ranges from 0.1 to 0.5 μm at the average roughness (Rz) of the ten point system.

On the other hand, for machining the highly hard material, a material for a tool is required to have a high hardness. Therefore, a content of CBN in the polycrystalline hard sintered body should be 20 vol % or more and 95 vol % or less. Considering the hardness, a single crystal CBN may be taken as a material for a tool in such a machining application. But, the single crystal material has a problem of easily generating breakage resulting in cleavages, and it is preferable in the machining of the highly hard material, to employ a polycrystalline CBN which is not liable to cleave.

In case the wedge angle θ3 which is between the flank and the rake face of the tool or between the flank and the negative land of the tool is less than 65°, the wedge angle is small. Therefore, a breakage is easy to occur at an initial period of cutting the highly hard material. In case the above mentioned wedge angle is more than 125°, since the cutting resistance remarkably increases, a required precision machining size is not achieved, although a desired finished surface roughness is provided. Thus, it is preferable that the wedge angle which is between the flank and the rake face of the tool or the flank and the negative land of the tool is 65° to 125°.

For setting the roughness of the ridge of the cutting edge within the range of 0.1 to 1.0 μm, it is preferable that average grain diameter of the contained polycrystalline CBN is below 5 μm, desirably below 1 μm. In case the average grain diameter of the contained CBN is less than 0.01 μm, the fine grains easily cohere at one portion in the sintered body, and the insert is easily broken thereby. So, preferably, the average grain diameter of the polycrystalline CBN sintered body ranges from 0.01 to 5 μm. Further, a cemented carbide or steel materials may be considered as the base material for the tool combining the hard sintered body, the base material for the tool is also required to have the high rigidity for machining the highly hard material. As the base material for the tool, therefore, the cemented carbide is most suited.

Figure 5:
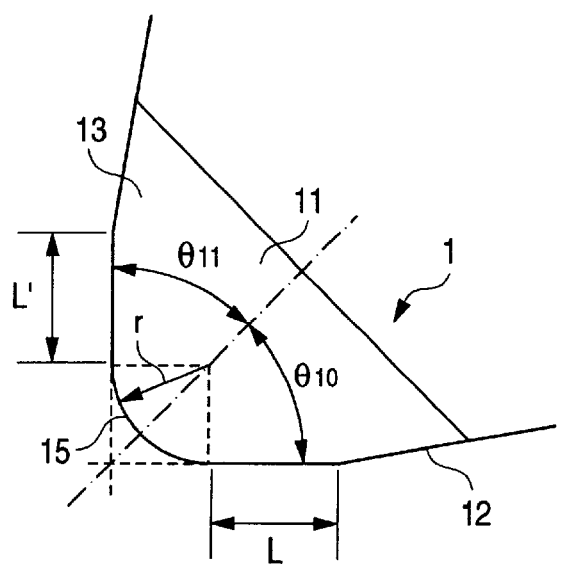
FIG. 5 is an enlarged front view showing the cutting tool concerned with the invention.

As shown in FIG. 5, in addition, a pair of straight cutting edges L and L' continued from respective terminals of the nose r of the polycrystalline hard sintered body toward the side of an indexable insert have respective lengths within the range of 0.2 to 0.6 mm, and in case an angle made between a straight line bisecting the nose r and the straight cutting edges L and L' is $42° \leq \theta 10$, $\theta 11 \leq 45°$, since the part of this straight cutting edge is finished as including a face to be machined in a cutting machining, the finished roughness is considerably improved.

In case the length of the straight cutting edge is less than 0.2 mm, an effect dragging a face of the work is small, and in case the length in turn exceeds 0.6 mm, a contacting part with the work increases, so that the cutting resistance is large, and it is difficult to secure the precision machining. Taking the above mentioned matters into consideration, it is preferable that the length of the straight cutting edge ranges from 0.2 to 0.6 (mm). Further, considering the balance between the machining precision and the finished surface roughness, a range from 0.3 to 0.5 (mm) is more preferable.

Similarly, in case the angle made between a straight line bisecting the nose r and the straight cutting edges L and L' is less than 42°, the effect of dragging a face of the workpiece is small. On the other hand, in case the angle in turn exceeds 45°, the contacting part with the workpiece increases, so that the cutting resistance is large, and it is difficult to secure the machining precision. Taking the above mentioned matters into consideration, preferably, the angle made between a straight line bisecting the nose r and the straight cutting edges L and L' is $42° \leq \theta 10$, $\theta 11 \leq 45°$. Further, considering the balance between the machining precision and the finished surface roughness, $43.5° \theta 10$, $\theta 11 \leq 45°$ is more preferable.

For further improving the finished surface roughness and lengthening the tool life, if a coated layer is formed on the surface of the polycrystalline hard sintered body by a chemical or physical vapor deposition, the wear of the tool decreases. Therefore, it is preferably enabled to maintain the excellent finished surface roughness for a long period of time.

Examples of the cutting tool of the invention will now be explained as follows.

EXAMPLE 1

Investigations were made to influences given to the finished surface roughness of the work piece and the machining precision by the roughness of the ridge of the cutting edge and the radius of curvature in cross section of the ridge of the cutting edge of the tool of the polycrystalline hard sintered body containing CBN. Table 1 shows examples of the indexable inserts of the polycrystalline sintered body containing the prepared various CBN. Each wedge angle of the inserts of the tools was 83°.

The indexable inserts in Table 1 have polycrystalline hard sintered bodies 11 brazed at the angle of the base material 1 as shown in FIG. 1, containing 50 vol % CBN of average grain diameter being 0.5 to 1 μm. Polishing was carried out with a #1000 diamond grinder for edging. Free diamond grinding grains of diameter being 5 to 8 μm (equivalent to #2000) were coated on the surface of a rotating brush, and pressed from the rake face of the indexable insert, whereby a honing machining operation was performed on the ridge of the cutting edge of the tool. The machining time was changed, and the radius of curvature in cross section of the ridge of the cutting edge was variously changed for making several samples.

Figure 4:
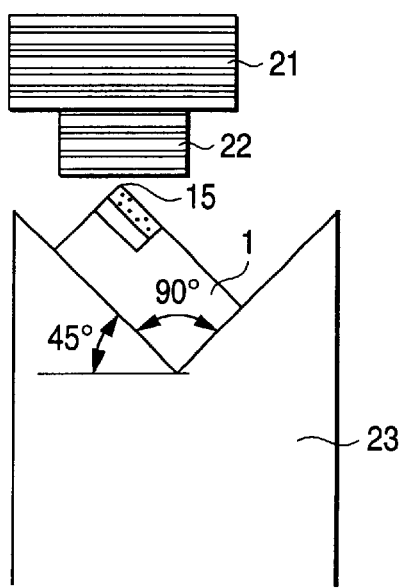
FIG. 4 is a view showing the method of measuring the roughness of the ridge of the cutting edge concerned with the invention.

The radius of curvature in cross section of the ridge of the cutting edge was measured with a con-tracer. The measuring principle of the con-tracer is the same as that of the surface roughness measuring gauge. The curvature of a curve obtained by making equal a longitudinal magnification and lateral magnification for measuring. As shown in FIG. 4, the cutting tool 1 was inclined 45° on a V block 23, and the roughness of the ridge of the cutting edge of each sample was measured. The roughness of the ridge of the cutting edge 15 was measured under the following conditions and a terminal 22 shaped as a knife edge directs along a direction of the ridge of the cutting edge 15 of the cutting tool.

Shape of a measurer: a terminal shaped as the knife edge

Measuring length: 1 mm

Feeding rate of the measurer: 0.03 mm/sec

Cut off length: 0.08 mm

Longitudinal magnification for measuring: 20,000 times

Lateral magnification for measuring: 100 times

TABLE 1

|  | Sample numbers | Radius of curvature in cross section | Surface roughness Rz of ridge of cutting edge |
|---|---|---|---|
| Com. | 1A | 1 ($\mu$m) | 5.21 ($\mu$m) |
| Inventive products | 1B | 5 ($\mu$m) | 0.98 ($\mu$m) |
|  | 1C | 15 ($\mu$m) | 0.87 ($\mu$m) |
|  | 1D | 30 ($\mu$m) | 0.65 ($\mu$m) |
| Com. | 1E | 40 ($\mu$m) | 0.56 ($\mu$m) |

Com.: Comparative Example

As a result, in the sample 1A where the radius of curvature in cross section of the ridge of the cutting edge was small, it was seen that chipping generated on the ridge of the cutting edge when grinding the rake face or the flank of the tool could not be removed by the honing, and surface roughness was thereby large. These five samples were subjected to the cutting test under the following conditions.

The workpiece and the cutting conditions are shown below.

Work piece: Cylindrical carbonized and hardened steel, (SCM415)
  Cutting of inner diameter of the material of 10 mm inner diameter Hardness of work piece: HRC62

Circumferential surface velocity of work piece: 100 (m/min)

Cut depth of the tool: 0.05 (mm)

Feeding rate of the tool: 0.03 (mm/rev)

Cutting time: 5 (min)

Machining method: Inner diameter boring machine

Requested roughness of finished surface: Rz=1.6 ($\mu$m) or less

Requested roundness: 3 $\mu$m or less

Table 2 shows the surface roughness and the roundness of the work after the cutting tests. In the sample 1A where the radius of curvature in cross section of the ridge of the cutting edge was small, although the cutting resistance was small and the roundness was excellent, since the roughness of the ridge of the cutting edge was large, the roughness on the finished surface to be transferred was large, and a desired finished roughness could not be provided.

On the other hand, in the sample 1E where the radius of curvature in cross section of the ridge of the cutting edge was large, although the surface roughness of the ridge of the cutting edge was small and the finished surface roughness to be transferred was excellent, since the cutting resistance was large and fluctuation thereby was large and a desired finished roughness could not be provided.

In contrast, in the samples 1B to 1D within the claimed range of the invention, it was seen that the surface roughness of the ridge of the cutting edge was small, and the excellent finished surface roughness was thereby provided. In addition, as the radius of curvature in cross section of the ridge of the cutting edge was small, increasing of the cutting resistance was controlled, and the roundness was kept within the requested precision. The high precision machining was apparent.

TABLE 2

|  | Sample numbers | Surface roughness Rz in inner diameter of work pieces | Roundness |
|---|---|---|---|
| Com. | 1A | 2.12 ($\mu$m) | 0.9 ($\mu$m) |
| Inventive products | 1B | 1.55 ($\mu$m) | 1.1 ($\mu$m) |
|  | 1C | 1.52 ($\mu$m) | 1.5 ($\mu$m) |
|  | 1D | 1.30 ($\mu$m) | 2.5 ($\mu$m) |
| Com. | 1E | 1.25 ($\mu$m) | 3.2 ($\mu$m) |

Com.: Comparative Example

EXAMPLE 2

Influences given to the finished surface roughness of the work piece and the precision machining were investigated by diversifying the roughness of the ridge of the cutting edge and the rake face of the tool of the polycrystalline hard sintered body containing CBN. Table 3 shows examples of the indexable inserts of the polycrystalline hard sintered body containing various CBN of the wedge angle being 115° at the inserts of the prepared tools.

The indexable inserts in Table 3 have polycrystalline hard sintered bodies brazed at the angular portion of the tool base material of cemented carbide, containing 65 vol % CBN of average grain diameter being 1 to 3 $\mu$m. The polishing was carried out with #1200 diamond grinder for edging.

The sample 2A was performed with the honing machine at the ridge of the cutting edge by pressing a rotating wire brush buried with diamond equivalent to #800 to the insert.

On the other hand, in the sample 2B, the diamond free grains of diameter being 8 to 16 $\mu$m (equivalent to #1500) were coated on the surface of the rotating brush, and pressed from the rake face of the indexable insert, whereby the honing machining was performed on the ridge of the cutting edge of the tool. The sample 2C was, similarly to 2B, prepared with the honing machine by coating the brush on the surface with free diamond grains of diameter being 5 to 8 $\mu$m (equivalent to #2000). The flank and the rake face are smoothly continued at the cutting edge ridge.

Thereafter, the roughness of the ridge of the cutting edge of each sample was measured by the same method as in the Example 1. For the surface roughness of the rake face, an acicular terminal was used, differently from the case of FIG. 4. The measuring conditions are shown below. The roughness of the rake face was measured by scanning a tracer in a direction right with a polishing direction of the rake face.

Shape of a measurer: a terminal shaped as the knife edge
  Acicular terminal

Measuring length: 1 mm

Feeding rate of the measurer: 0.03 mm/sec

Cut off length: 0.08 mm

Longitudinal magnification for measuring: 20,000 times

Lateral magnification for measuring: 100 times

TABLE 3

| | Sample numbers | Radius of curvature in cross section | Roughness Rz in rake face of tool | Surface roughness Rz of ridge of insert |
|---|---|---|---|---|
| Com. | 2A | 14 ($\mu$m) | 0.72 ($\mu$m) | 1.23 ($\mu$m) |
| Inventive products | 2B | 14 ($\mu$m) | 0.36 ($\mu$m) | 0.51 ($\mu$m) |
| | 2C | 14 ($\mu$m) | 0.25 ($\mu$m) | 0.44 ($\mu$m) |

Com.: Comparative Example

As a result, it was seen that in the sample 2A where the insert was performed with the honing machine by a diamond wire brush of comparatively coarse grain, an effect of improving the roughness on the rake face or the flank face of the tool was low, and the surface roughness of the ridge of the cutting edge formed with these faces had a large value.

These three samples were subjected to the cutting tests under the following conditions.

The work piece and the cutting conditions are shown below.

Work piece: Bearing steel (SUJ2) of round bar of 100 mm outer diameter
Hardness of work piece: H$_{RC}$63
Circumferential surface velocity of work piece: 120 (m/min)
Cut depth of the tool: 0.04 (mm)
Feeding rate of the tool: 0.02 (mm/rev)
Cutting time: 15 (min)
Machining method: Outer diameter cutting
Requested roughness of finished surface: Rz=1.0 ($\mu$m) or less An initial period of the cutting tests and the results of the surface roughness after 15 minutes are shown in Table 4.

TABLE 4

| | Sample numbers | Surface roughness Rz in work pieces at initial cutting | Surface roughness Rz in work pieces after 15 minutes |
|---|---|---|---|
| Com. | 2A | 1.38 ($\mu$m) | 2.15 ($\mu$m) |
| Inventive products | 2B | 0.64 ($\mu$m) | 0.99 ($\mu$m) |
| | 2C | 0.53 ($\mu$m) | 0.78 ($\mu$m) |

Com.: Comparative Example

As a result, in the sample 2A, since the roughness of the ridge of the cutting edge was large and transferred to the surface of the work piece, the requested surface roughness could not be provided at the early cutting period. On the other hand, in the samples 2B and 2C where the roughness of the ridge of the cutting edge, the excellent finished surfaces could be provided and the requested surface could be secured.

In particular, in the sample 2C where the surface roughness on the rake face of the tool was small, the insert of the tool was worn as progressing the cutting, and even if the ridge of the cutting edge moved backward, as the roughness on the rake face of the tool was small, a roughness of a new ridge of the cutting edge was small, and the excellent finished surface roughness could be provided stable.

EXAMPLE 3

Influences given to the roughness of the ridge of the cutting edge and the finished surface roughness of the work piece were investigated by diversifying the average grain size of CBN of the tool of the polycrystalline hard sintered body containing CBN. The wedge angle at the insert of the prepared tool was 108°. The examples of the various tools of CBN are shown in Table 5.

TABLE 5

| | Sample numbers | Average diameter of CBN grain | Roughness Rz of ridge of cutting edge |
|---|---|---|---|
| Com. | 3A | 0.004 ($\mu$m) | Occurrence of breakage |
| Inventive products | 3B | 0.01 ($\mu$m) | 0.25 ($\mu$m) |
| | 3C | 0.1 ($\mu$m) | 0.28 ($\mu$m) |
| | 3D | 1.0 ($\mu$m) | 0.33 ($\mu$m) |
| | 3E | 5.0 ($\mu$m) | 0.60 ($\mu$m) |
| Com. | 3F | 8.0 ($\mu$m) | 1.65 ($\mu$m) |

Com.: Comparative Example

The cutting tool of Table 5 is a bite which is connected to a shank front end with the polycrystalline hard sintered body containing CBN having the average grain diameter shown in Table 5, said shank being made of a steel of $\phi$6 mm circle in cross section. The contents of CBN are each 55 vol %. The polishing was carried out with the grinder of diamond grain being #1000 for edging. Then, the inserts of the tools were honing-machined in the same procedure as in the Example 1, and the results are shown in Table 5. The radius of curvature in cross section of the ridge of the cutting edge was 20 $\mu$m.

Among them, in the sample 3A where the grain size of the sintered body was very fine, there existed non-uniform structures resulted in coherent grains in the sintered ones, so that the insert had the low strength and was easily broken.

With respect to the samples 3B to 3F where the inserts were not broken, the cutting tests were performed under the following conditions.

Work piece: Cylindrical die steel (SKD11) cutting inner diameter of 20 mm inner diameter
Hardness of work piece: H$_{RC}$65
Surface velocity in the inner diameter of work piece: 70 (m/min)
Cut depth of the tool: 0.05 (mm)
Feeding rate of the tool: 0.03 (mm/rev)
Cutting distance: 2 (km)
Machining method: Inner diameter cutting
Requested roughness of finished surface: Rz=1.6 ($\mu$m) or less Table 6 shows the surface roughness on the inner diameter of the obtained work pieces.

TABLE 6

| | Sample numbers | Surface roughness Rz in finished surfaces of inner diameter of work pieces |
|---|---|---|
| Inventive products | 3B | 1.05 ($\mu$m) |
| | 3C | 1.22 ($\mu$m) |
| | 3D | 1.34 ($\mu$m) |
| | 3E | 1.38 ($\mu$m) |
| Com. | 3F | 1.78 ($\mu$m) |

Com.: Comparative Example

As a result, in the sample 3F where the average grain size of CBN was large, since the roughness of the ridge of the cutting edge was large, the requested roughness on the finished surface of the workpiece could not be provided. On the other hand, in the samples 3B to 3E of the invention, it was seen that as the roughness of the ridge of the cutting edge was small, the requested roughness could be stably achieved, and the machining was performed with high precision.

EXAMPLE 4

Influences given to the machining precision of the work piece and the finished surface roughness were investigated by diversifying the wedge angle at the insert of the tool as the angle made between the flank and the negative land of the tool of sintered body of CBN. Table 7 shows the examples of the indexable inserts of sintered body of the prepared various CBN.

TABLE 7

|  | Sample numbers | Flank angle of tool | Negative land | Wedge angle of inserts of tool |
| --- | --- | --- | --- | --- |
| Com. | 4A | 30° | 0° | 60° |
| Inventive products | 4B | 25° | 0° | 65° |
|  | 4C | 15° | 0° | 75° |
|  | 4D | 15° | 15° | 90° |
|  | 4E | 15° | 30° | 105° |
|  | 4F | 0° | 15° | 105° |
|  | 4G | 0° | 25° | 115° |
|  | 4H | 0° | 35° | 125° |
| Com. | 4I | 0° | 40° | 130° |

Com.: Comparative Example

The indexable inserts in Table 7 have polycrystalline hard sintered bodies brazed at the corner of the tool base material of cemented carbide, containing 70 vol % CBN of average grain diameter being 1.2 $\mu$m. The wedge angle at the insert of the tool made between the flank and the negative land is variously changed. The edging treatments were performed by means of the diamond grinder of grain size being #1500, and the samples 4A to 4I of the radius of curvature in cross section of the ridge of the cutting edge being 28 $\mu$m were provided through the same procedure as in the Example 1. The surface roughness of the ridge of the cutting edge was then in the range of Rz=0.3 to 0.8 $\mu$m.

The cutting test was performed with these cutting tools under the following conditions.

Work piece: Carbonized and hardened steel cylindrical (SCM420)
    Cutting of inner diameter of material of 15 mm inner diameter
Hardness of work piece: H$_{RC}$59
Circumferential surface velocity of work piece: 100 (m/min)
Cut depth of the tool: 0.07 (mm)
Feeding rate of the tool: 0.06 (mm/rev)
Cutting time: 5 (min)
Machining method: Inner diameter boring machine
Requested roughness of finished surface: Rz=2 $\mu$m or less
Requested roundness: 3 $\mu$m or less

TABLE 8

|  | Sample numbers | Surface roughness Rz in finished surface of work pieces | Roundness |
| --- | --- | --- | --- |
| Com. | 4A | Breakage at initial period | Breakage at initial period |
| Inventive products | 4B | 1.32 ($\mu$m) | 1.1 ($\mu$m) |
|  | 4C | 1.21 ($\mu$m) | 1.1 ($\mu$m) |
|  | 4D | 1.20 ($\mu$m) | 1.2 ($\mu$m) |
|  | 4E | 1.18 ($\mu$m) | 1.5 ($\mu$m) |
|  | 4F | 1.18 ($\mu$m) | 1.6 ($\mu$m) |
|  | 4G | 1.09 ($\mu$m) | 1.9 ($\mu$m) |
|  | 4H | 1.05 ($\mu$m) | 2.5 ($\mu$m) |
| Com. | 4I | Occurrence of chatter | Occurrence of chatter |

Com.: Comparative Example

As apparently from Table 8, in the sample 4A where the wedge angle at the insert of the tool made between the flank and the negative land was small, since the wedge angle was small, the insert was broken at the initial cutting, and evaluations could not be continued.

On the other hand, in the sample 4I where the wedge angle at the insert of the tool made between the flank and the negative land was large, as the cutting resistance was high and fluctuation thereby was large, chatters occurred and the evaluations could not be continued.

On the other hand, in the samples 4B to 4H of the invention, it was seen that as the cutting resistance was small and fluctuation thereby was small, the machine could be carried out within the requested roundness and the excellent finished surface roughness could be machined.

EXAMPLE 5

Cutting length in the following example was longer than former example. Influences given to the cut surface were investigated by diversifying the length of a pair of straight cutting edges formed from the terminal of the nose r of the polycrystalline hard sintered body to the side. The honing machining by the free grinding grains was performed to the indexable insert of the polycrystalline hard sintered body containing the prepared various CBN. The cutting tests were carried out to these samples under the following conditions.

The work pieces and the cutting conditions are shown below.

Work piece: Carbonized and hardened steel (SCM415),
    Cutting of the outer diameter of round bar of 50 (mm) diameter and 100 (mm) of longitudinal length
Hardness of work piece: H$_{RC}$60
Circumferential surface velocity of work piece: 120 (m/min)
Cut depth of the tool: 0.05 (mm)
Feeding rate of the tool: 0.08 (mm/rev).
Cutting length: 5 km
Holder type number: PCLNR2525-33
Test tip shape: Indexable insert of around 80° rhomboid with straight flat drag of inscribing circle being 12.7 mm
Angle made between bisecting line of the nose r and the straight flat drag: 44.5 degree.

TABLE 9

| Sample numbers | Width of straight cutting edge | Surface roughness Rz in outside of work pieces | Roundness |
| --- | --- | --- | --- |
| 9A | 0 (mm) | 2.04 (μm) | 1.90 (μm) |
| 9B | 0.05 (mm) | 1.97 (μm) | 1.94 (μm) |
| 9C | 0.2 (mm) | 1.80 (μm) | 2.24 (μm) |
| 9D | 0.4 (mm) | 1.69 (μm) | 2.51 (μm) |
| 9E | 0.6 (mm) | 1.53 (μm) | 2.63 (μm) |
| 9F | 0.8 (mm) | 1.48 (μm) | 3.21 (μm) |

By this result, since the effect of dragging the cut surface is large the straight cutting edge is as wide that the surface roughness is improved. But, when the width of the straight cutting edge is so wide that the cutting resistance is high, therefore the roundness also became large. Therefore, it was apparent that the preferable width of the straight cutting edge enabling to form a preferable roundness and surface roughness, is within the range of 0.2 to 0.6 (mm).

EXAMPLE 6

Influences given to the cut surface were investigated by diversifying the angle made between the straight line bisecting the nose r of the polycrystalline hard sintered body and a pair of straight cutting edges directing from the respective terminals of the nose r toward the side of the indexable insert and connected to the nose r. The honing machining by the free grinding grains was performed to the indexable insert of the polycrystalline hard sintered body of sample 2C in Example 2. The cutting tests were carried out to these samples under the following conditions.

The work pieces and the cutting conditions are shown below.

Work piece: Carbonized and hardened steel (SCr420)
  Cutting of the outer diameter of round bar of 60 (mm) diameter and 120 (mm) of longitudinal length
Hardness of work piece: HRC60
Circumferential surface velocity of work piece: 100 (m/min)
Cut depth of the tool: 0.06 (mm)
Feeding rate of the tool: 0.07 (mm/rev)
Cutting length: 4 km
Holder type number: PWCLNR2525-33
Test tip shape: Indexable insert of around 80° hexagon with straight flat drag of inscribing circle being 12.7 mm
Length of the straight flat drag: 0.4 (mm).

TABLE 10

| Sample numbers | Crossing angle between bisector of nose r and straight cutting edge | Surface roughness Rz in outside of work pieces | Roundness |
| --- | --- | --- | --- |
| 10A | 41.5 (degree) | 2.14 (μm) | 2.04 (μm) |
| 10B | 42.0 (degree) | 1.99 (μm) | 2.20 (μm) |
| 10C | 43.0 (degree) | 1.91 (μm) | 2.35 (μm) |
| 10D | 44.0 (degree) | 1.73 (μm) | 2.42 (μm) |
| 10E | 45.0 (degree) | 1.60 (μm) | 2.55 (μm) |
| 10F | 45.5 (degree) | 1.48 (μm) | 2.94 (μm) |

By this result, since the effect including the cut surface is large as the crossing angle between the bisector of the nose r and the straight cutting edge becomes large, the surface roughness is improved. But, when the crossing angle is large, the cutting resistance is high, so that the roundness also becomes large. Therefore, it was apparent that the preferable width of the straight cutting edge, enabling to form a moderate roundness and surface roughness is within the range of 42.0 to 45.0 (degree).

EXAMPLE 7

Influences when the coated layer was formed on the surface of the polycrystalline hard sintered body by the chemical or physical vapor deposition. Table 11 shows the examples of the indexable inserts of the polycrystalline hard sintered body was made from sample 2C in Example 2. The respective tips were honing-machined at the ridges of the cutting edges by the rotating brush. 10A is a tip without the coated layer, 10B is a tip formed with the TiN coated layer of 2 (μm) thickness by the PVD machine, and 10C is a tip formed with the TiAlN coated layer of 2 (μm) thickness by the PVD machine.

TABLE 11

| Sample numbers | Coated layers |
| --- | --- |
| 11A | Non |
| 11B | TiN |
| 11C | TiAlN |

With respect to these samples, the cutting tests were practiced under the following conditions.

Work piece: Carbonized and hardened steel (SCM415)
Hardness of work piece: HRC58
Circumferential surface velocity of work piece: 70 (m/min)
Cut depth of the tool: 0.05 (mm)
Feeding rate of the tool: 0.03 (mm/rev)
Cutting length: 5 km
The results of the cutting test are shown in Table 12.

TABLE 12

| Sample numbers | Coated layers | Surface roughness Rz in outside of work pieces |
| --- | --- | --- |
| 11A | Non | 2.04 (μm) |
| 11B | TiN | 1.27 (μm) |
| 11C | TiAlN | 1.55 (μm) |

By the results, it was apparent that the tip coated by the PVD machine was delayed in development of wear in the ridge of the cutting edge than the conventional non-coated tip, so that the more excellent surface roughness could be maintained for a long period of time.

In a cutting tool of the present invention, it is preferable that the coated layer comprises at least one kind element selected from groups comprising elements of 4a, 5a and 6a groups corresponding to the periodic table and elements of Al, Si and B nitride.

In addition, it is also preferable that the coated layer comprises at least one kind compound selected from nitride, carbide and oxide being at least one kind of metals selected from said groups and solid solution of nitride, carbide and oxide.

According to the invention, the cutting tool in which the radius of curvature in cross section of the ridge of the cutting edge is from 5 μm to 30 μm, and the surface roughness of the ridge of the cutting edge is from 0.1 μm to 1.0 μm, could be machined at the high precision by cutting hardened steels or cast irons. That is, if using the cutting tool of the invention, the surface roughness of the work piece being 1.6

μm or lower and the roundness 3 μm or lower could be accomplished. Therefore, the machine which conventionally depended on the non-efficient grinding is substituted with the cutting, and the machining efficiency can be rapidly improved.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A cutting tool of a polycrystalline hard sintered material adapted to cut a hardened steel or a cast iron, comprising a cutting edge that comprises the polycrystalline hard sintered material which contains at least 20 vol % of CBN, wherein a radius of curvature in cross section of a ridge of said cutting edge has a range of 5 μm to 30 μm, a flank and a rake face or negative land of the cutting tool are smoothly continued at said radius of curvature in cross section, and a surface roughness of the ridge of the cutting edge has a range of 0.1 μm to 1.0 μm corresponding to an average roughness (Rz) of a ten point system.

2. The cutting tool of the polycrystalline hard sintered material according to claim 1, wherein said surface roughness on the rake face or negative land of said cutting tool had a range of 0.1 μm to 0.5 μm corresponding to the average roughness (Rz) of the ten point system.

3. The cutting tool of the polycrystalline hard sintered material according to claim 1, wherein a wedge angle at an insert of said cutting tool, made between said flank and said rake face of the tool or the flank and the negative land of the tool has a range of 65° to 125°.

4. The cutting tool of the polycrystalline hard sintered material according to claim 1, wherein the polycrystalline hard sintered material contains 20 vol % or more said CBN, and the average grain diameter thereof has a range of 0.01 μm to 5 μm.

5. The cutting tool of the polycrystalline hard sintered material according to claim 1, comprising a base material of the tool made of cemented carbide, wherein said polycrystalline hard sintered material is bonded to said base.

6. The cutting tool of the polycrystalline hard sintered material according to claim 1, comprising:

an indexable insert of the polycrystalline hard sintered material; and a nose r of the polycrystalline hard sintered material, wherein said indexable insert comprising a pair of straight cutting edges whose length have a range of 0.2 to 0.6 mm, said cutting edges is connected to said nose r from respective terminals of said nose r toward the side of said indexable insert, and an angle θ which is formed between a straight line bisecting said nose r and said straight cutting edges has one of ranges of 42°≦θ or θ≦45°.

7. The cutting tool of the polycrystalline hard sintered material according to claim 6, wherein said indexable insert comprises a coated layer which is formed on the surface of said cutting tool of the polycrystalline hard sintered material, and wherein said coated layer comprising at least one element selected from the group consisting of elements of 4a, 5a and 6a groups corresponding to the periodic table and elements of Al, Si and B; or at least one compound selected from nitrides, carbides and oxides of a metal selected from said group and solid solutions thereof.

8. A cutting tool adapted to cut a workpiece of hardened steel or of cast iron, comprising a cutting edge member formed of a polycrystalline hard sintered material containing at least 20 vol. % of cubic boron nitride, wherein:

said cutting edge member has a cutting edge with a cutting edge ridge formed between a flank face and a rake face or a negative land of said cutting edge member;

said cutting edge ridge has a radius of curvature in a range from 5 μm to 30 μm in a cross section of said cutting edge;

said flank face and said rake face or said negative land extend smoothly and continuously from said cutting edge at said radius of curvature in said cross section; and said cutting edge ridge has an average surface roughness (Rz) of a ten point system in a range from 0.1 μm to 1.0 μm.

* * * * *